US011037312B2

(12) United States Patent
Gonzalez Aguirre et al.

(10) Patent No.: US 11,037,312 B2
(45) Date of Patent: Jun. 15, 2021

(54) TECHNOLOGIES FOR THERMAL ENHANCED SEMANTIC SEGMENTATION OF TWO-DIMENSIONAL IMAGES

(71) Applicant: Intel Corporation, Santa Clara, CA (US)

(72) Inventors: David Israel Gonzalez Aguirre, Hillsboro, OR (US); Javier Felip Leon, Hillsboro, OR (US); Maria Soledad Elli, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 16/457,949

(22) Filed: Jun. 29, 2019

(65) Prior Publication Data
US 2020/0143551 A1    May 7, 2020

(51) Int. Cl.
| G06T 7/37 | (2017.01) |
| G06T 7/187 | (2017.01) |
| G06T 3/00 | (2006.01) |
| G06T 3/40 | (2006.01) |
| G06K 9/00 | (2006.01) |
| G06T 5/20 | (2006.01) |

(52) U.S. Cl.
CPC ............ *G06T 7/37* (2017.01); *G06K 9/00536* (2013.01); *G06K 9/00791* (2013.01); *G06T 3/0068* (2013.01); *G06T 3/4007* (2013.01); *G06T 5/20* (2013.01); *G06T 7/187* (2017.01); *G06T 2207/10048* (2013.01); *G06T 2207/20084* (2013.01)

(58) Field of Classification Search
None
See application file for complete search history.

(56) References Cited

U.S. PATENT DOCUMENTS

| 9,965,865 B1* | 5/2018 | Agrawal ............ G06K 9/00234 |
| 2018/0164156 A1* | 6/2018 | Price ..................... G01J 3/0264 |

(Continued)

OTHER PUBLICATIONS

Pohlen, et al., Full-Resolution Residual Networks for Semantic Segmentation in Street Scenes, Dec. 6, 2016 (12 pages).

(Continued)

*Primary Examiner* — Leon Flores
(74) *Attorney, Agent, or Firm* — Alliance IP, LLC (57) ABSTRACT

Technologies for thermal enhanced semantic segmentation include a computing device having a visible light camera and an infrared camera. The computing device receives a visible light image of a scene from the visible light camera and an infrared image of the scene from the infrared camera. The computing device registers the infrared image to the visible light image to generate a registered image. Registering the infrared image may include increasing resolution of the infrared image. The computing device generates a thermal boundary saliency image based on the registered infrared image. The computing device may generate the thermal boundary saliency image by applying a Gabor jet convolution to the registered infrared image. The computing device performs semantic segmentation on the visible light image, the registered infrared image, and the thermal boundary saliency image to generate a pixelwise semantic classification of the scene. Other embodiments are described and claimed.

25 Claims, 3 Drawing Sheets

(56) References Cited

U.S. PATENT DOCUMENTS

2019/0050648 A1\* 2/2019 Stojanovic .............. G06T 11/60
2019/0347767 A1\* 11/2019 Yang .................... G06K 9/3233

OTHER PUBLICATIONS

Cadena et al., Semantic Segmentation with Heterogeneous Sensor Coverages (7 pages).
Kniaz et al., Thermalnet: A Deep Convolutional Network for Synthetic Thermal Image Generation, May 2017 (5 pages).

\* cited by examiner

TECHNOLOGIES FOR THERMAL ENHANCED SEMANTIC SEGMENTATION OF TWO-DIMENSIONAL IMAGES

BACKGROUND

Typical computing devices may use deep learning algorithms, also known as artificial neural networks, to classify objects in a scene. For example, autonomous vehicles may classify objects in their environment to generate driving plans considering the nature (e.g., dynamic or static) of each object class in the scene. Typical systems may perform sensing using two-dimensional color cameras. Objects at different locations but with similar color appearance may be blended into a single color region, which may reduce classification accuracy.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
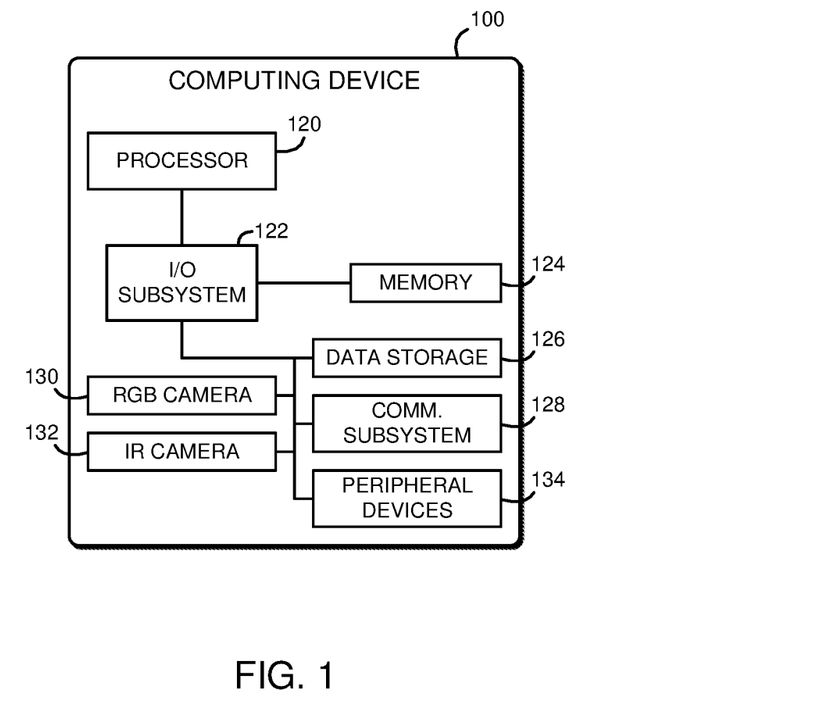
FIG. 1 is a simplified block diagram of at least one embodiment of a computing device for thermal enhanced semantic segmentation.

Referring now to FIG. 1, an illustrative computing device 100 for thermal enhanced semantic segmentation includes an RGB camera 130 and an infrared (IR) camera 132. In use, as described below, the computing device 100 captures input image data of the same scene from the RGB camera 130 in visible light and from the IR camera 132 in infrared light. The computing device 100 enhances the input infrared image data by registering the image with the visible light image and highlighting salience boundaries in the thermal image. The computing device 100 provides the visible light image and the enhanced infrared light image data to a pixelwise semantic classifier including an artificial neural network (ANN), which outputs a pixelwise semantic classification of the scene. The computing device 100 may use the pixelwise semantic classification for autonomous driving operations or other computer vision applications. Thus, the computing device 100 performs classification using enhanced thermal image information that is temporally consistent, spatially coherent, and with orthogonal modality to the visible light image data available to traditional systems, which may improve classification accuracy. In particular, the computing device 100 may improve classification and boundary detection for small and/or distant objects as compared to existing systems. Additionally, the computing device 100 may generate the enhanced thermal image information with lower-resolution IR cameras 132 that have lower cost, weight, and/or power consumption and are thus compatible with vehicle applications.

The computing device 100 may be embodied as any type of device capable of object detection and otherwise performing the functions described herein. For example, the computing device 100 may be embodied as, without limitation, a computer, a workstation, a server, a laptop computer, a notebook computer, a tablet computer, a smartphone, a wearable computing device, a multiprocessor system, an electronic control unit (ECU), an in-vehicle infotainment device, and/or a consumer electronic device. In some embodiments, the computing device 100 may be included in or otherwise incorporated with an autonomous vehicle, a semi-autonomous vehicle, an automated or partially automated vehicle, or other advanced vehicle. As shown in FIG. 1, the illustrative computing device 100 includes a processor 120, an I/O subsystem 122, a memory 124, and a data storage device 126. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The data storage device 126 may store image data, training data, or other data used for object detection.

The computing device 100 may also include a communications subsystem 128, which may be embodied as any communication circuit, device, or collection thereof, capable of enabling communications between the computing device 100 and other remote devices over a computer network (not shown). The communications subsystem 128 may be configured to use any one or more communication technology (e.g., wired or wireless communications) and associated protocols (e.g., Ethernet, InfiniBand®, Bluetooth®, Wi-Fi®, WiMAX, 3G, 4G LTE, 5G, etc.) to effect such communication.

The RGB camera 130 may be embodied as a digital camera or other digital imaging device integrated with the computing device 100 or otherwise communicatively coupled thereto. The RGB camera 130 captures image data in the visible light spectrum. The visible light image data may be represented with three channels of color data (e.g., red, blue, and green channels). Each channel may have a bit depth of 8 bits, 10 bits, or other bit depth. The RGB camera 130 includes an electronic image sensor, such as an active-pixel sensor (APS), e.g., a complementary metal-oxide-semiconductor (CMOS) sensor, or a charge-coupled device (CCD).

Similarly, the IR camera 132 may be embodied as a digital camera or other digital imaging device integrated with the computing device 100 or otherwise communicatively coupled thereto. Differently from the RGB camera 130, the IR camera 132 captures image data in the infrared (IR) light spectrum. Thus, the IR image data captured by the IR camera 132 represents the surface temperature of objects in the scene. The infrared image data may be represented with a single channel of IR intensity data. The IR camera 132 may generate image data with lower resolution (e.g., fewer pixels) as compared to the RGB camera 130. Thus, the IR camera 132 may be embodied as a relatively low-cost, low-weight, and/or low-power camera.

The computing device 100 may further include one or more peripheral devices 134. The peripheral devices 134 may include any number of additional sensors, input/output devices, interface devices, and/or other peripheral devices. For example, in some embodiments, the peripheral devices 134 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 2:
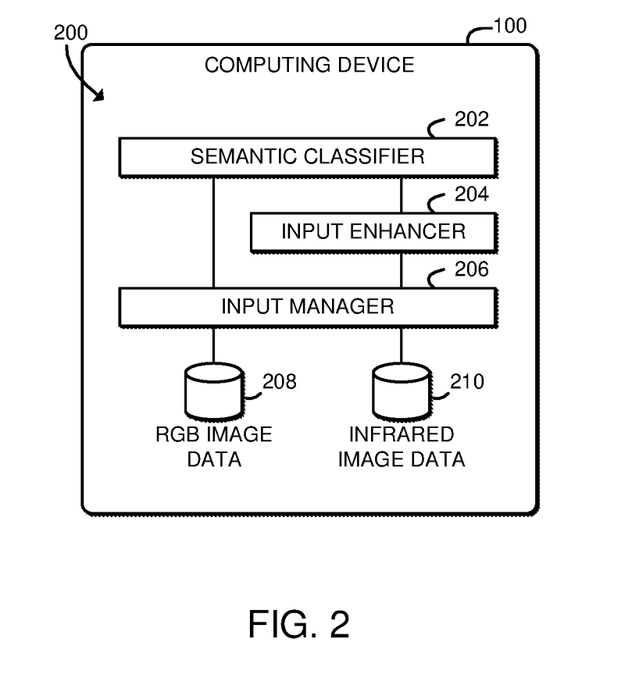
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes a semantic classifier 202, an input enhancer 204, and an input manager 206. The various components of the environment 200 may be embodied as hardware, firmware, software, or a combination thereof. As such, in some embodiments, one or more of the components of the environment 200 may be embodied as circuitry or collection of electrical devices (e.g., semantic classifier circuitry 202, input enhancer circuitry 204, and/or input manager circuitry 206. It should be appreciated that, in such embodiments, one or more of the semantic classifier circuitry 202, the input enhancer circuitry 204, and/or the input manager circuitry 206 may form a portion of the processor 120, the I/O subsystem 122, and/or other components of the computing device 100 (e.g., a GPU, a processor graphics, a neural network accelerator, or other accelerator device in some embodiments). Additionally, in some embodiments, one or more of the illustrative components may form a portion of another component and/or one or more of the illustrative components may be independent of one another.

The input manager 206 is configured to receive a visible light image of a scene from the visible light camera 130. The visible light image is illustrated as RGB image data 208, and may be embodied as three-channel, 24-bit color image data, 30-bit color image data, or other color image data. The input manager 206 is further configured to receive an infrared light image of the same scene from the infrared light camera 132. The infrared light image is illustrated as infrared image data 210, and may be embodied as one-channel, 8-bit image data, 10-bit image data, or other image data.

The input enhancer 204 is configured to register the input infrared light image to the visible light image to generate a registered infrared light image. The registered infrared light image has a resolution (e.g., width and height) equal to the resolution of the visible light image. Registering the input infrared light image may include increasing the resolution of the input infrared light image (e.g., by performing bicubic convolutional interpolation) and/or transforming geometry of the input infrared light image based on a kinematic calibration associated with the input infrared light image. The input enhancer 204 is further configured to generate a thermal boundary saliency image based on the registered infrared light image. The thermal boundary saliency image may be generated by processing the registered infrared light image with a Gabor jet convolution. The Gabor jet convolution may include multiple Gabor kernel convolution layers, with each Gabor kernel convolution layer having a different phase angle. The thermal boundary saliency image includes a Gabor magnitude image.

The semantic classifier 202 is configured to perform semantic segmentation on the visible light image, the registered infrared light image, and the thermal boundary saliency image. Performing the semantic segmentation may include processing the visible light image, the registered infrared light image, and the thermal boundary saliency image with an artificial neural network (ANN). Each color of the visible light image, as well as the registered infrared light image and the thermal boundary saliency image may be input as separate channels to the ANN. The semantic classifier 202 is further configured to output a pixelwise semantic classification of the scene in response to performing the semantic segmentation.

Figure 3:
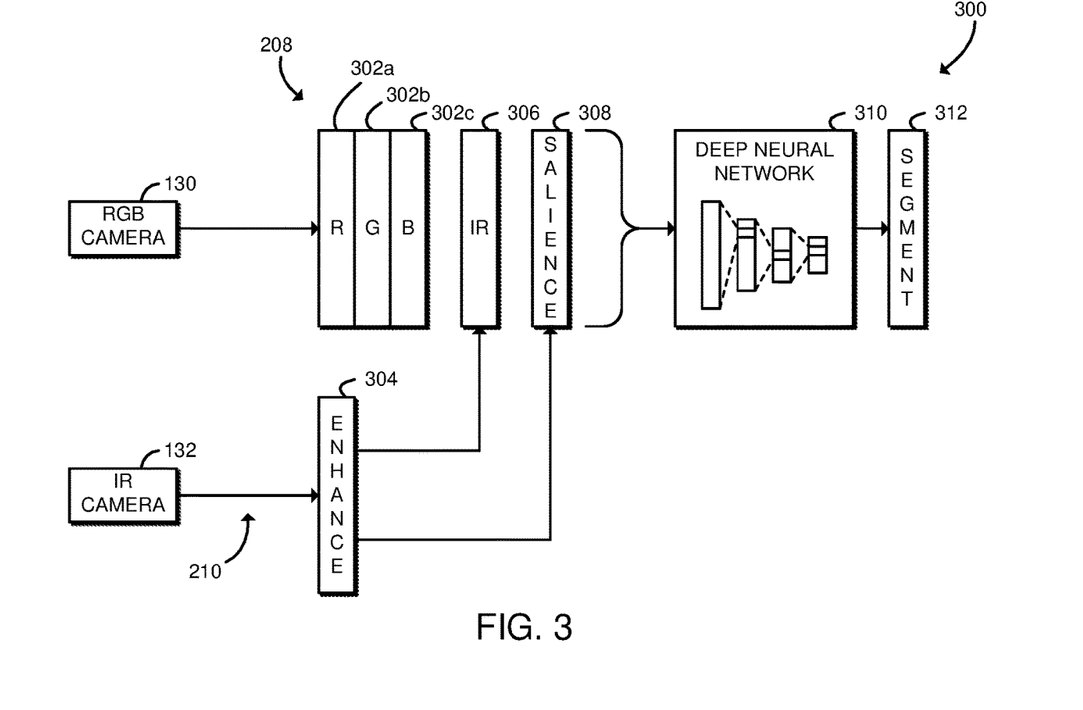
FIG. 3 is a simplified block diagram of a semantic segmentation network that may be established by the computing device of FIGS. 1-2.

Referring now to FIG. 3, diagram 300 illustrates a semantic segmentation network that may be established by the computing device 100. The diagram 300 illustrates one potential arrangement of the components of the environment 200 that may be executed by the computing device 100. As shown, the RGB camera 130 inputs visible light image data 208 as RGB image data 302. Illustratively, the image data 302 includes a red channel 302*a*, a blue channel 302*b*, and a green channel 302*c*. The IR camera 132 inputs IR light image data 210 to an input enhancement layer 304. Although not fully orthogonal from surface color, the IR image data 210 provides an input modality that is not directly dependent or correlated to the RGB image data 208. The input enhancement layer 304 outputs a registered infrared image channel 306 and a thermal boundary saliency image channel 308. After input enhancement, RGB image data 302 and thermal data 306, 308 exists for each pixel in the overlapping field of view of the cameras 130, 132. One potential embodiment of the input enhancement layer 304 is shown in FIG. 4 and described below.

The RGB image data channels 302*a*, 302*b*, 302*c*, the registered infrared image channel 306, and the thermal boundary saliency image channel 308 are input to a deep neural network (DNN) 310 that is trained for semantic segmentation. The DNN 310 may be embodied as a multi-layered artificial neural network that supports channel stacking at the input layers. Thus, the DNN 310 may include one or more convolution layers, fully connected layers, pooling layers, or other machine learning components. Although illustrated as a DNN, it should be understood that in some embodiments the segmentation network may include any semantic segmentation method that supports channel stacking at the input layers.

The DNN 310 outputs a segmentation classification 312. The segmentation classification 312 identifies a classification associated with each pixel of the input image data. The classification may identify objects in the scene, such as dynamic objects (e.g., vehicles, pedestrians, obstacles in the roadway, foreground objects, etc.) and static objects (e.g., road surface, road markings, buildings, background objects, etc.). The DNN 310 may be trained using a labeled training set that includes RGB images and IR images. In some embodiments, the IR images in training data set may be synthetic IR images generated from RGB images using a deep convolutional network.

Figure 4:
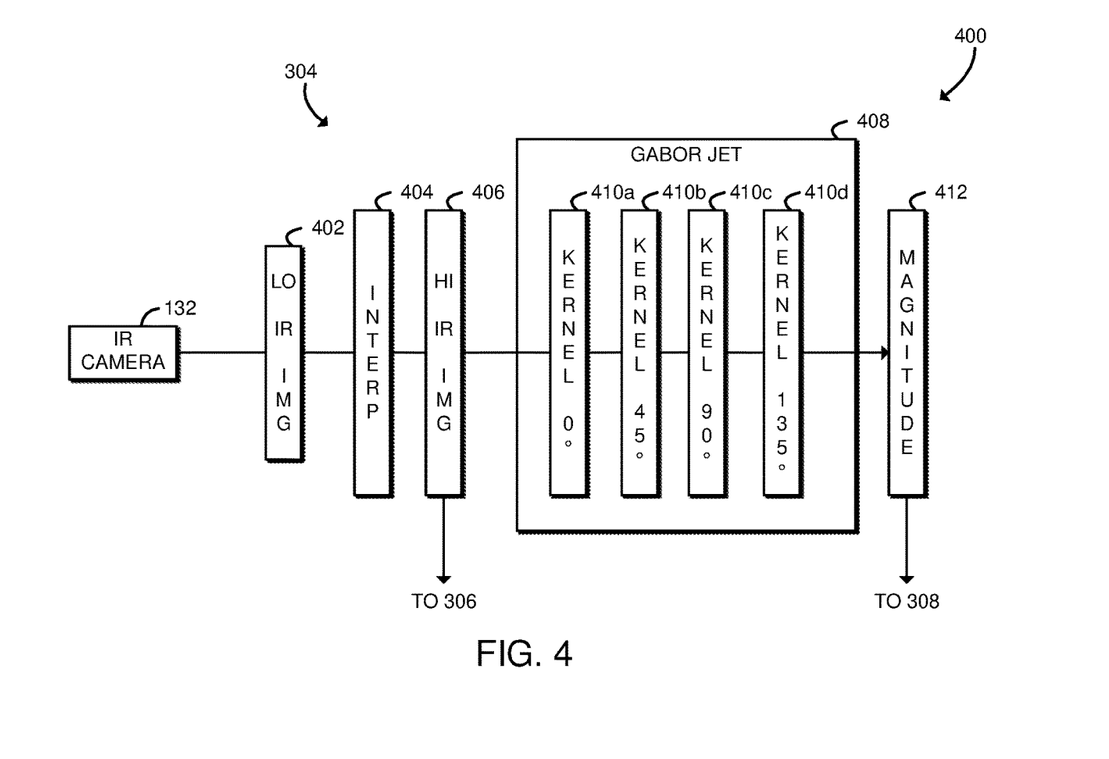
FIG. 4 is a simplified block diagram of an input enhancement layer that may be established by the computing device of FIGS. 1-2.

Referring now to FIG. 4, diagram 400 illustrates an input enhancement layer that may be established by the computing device 100. The diagram 400 illustrates one potential embodiment of the input enhancement layer 304 of FIG. 3. As shown, the IR camera 132 generates low-resolution IR image 402. The low-resolution IR image 402 is input to an interpolation layer 404. The interpolation layer 404 increases the resolution of the low-resolution IR image 402 to generate high-resolution IR image 406. The high-resolution IR image 406 is output as the registered infrared image channel 306 of FIG. 3. Thus, the high-resolution IR image 406 has the same resolution as the visible light image 302. In some embodiments, the low-resolution IR image 402 may also be geometrically registered with the visible light image 302.

The high-resolution IR image 406 is input to a Gabor jet 408. The Gabor jet 408 is embodied as a bank of two or more Gabor kernel 410 based convolution layers, which objective is to collect an oriented normalized saliency receptive field with median-based global normalization output. Each Gabor kernel 410 may be embodied as an oriented filter composed by harmonics (e.g., a sinusoidal wave or plane wave) and a Gaussian kernel. Each of the Gabor kernels 410 has an associated kernel phase angle, and the Gabor jet 408 includes Gabor kernels 410 with different phase angles, which may extract features from the high-resolution IR image 406 in multiple orientations. In some embodiments, more than two kernels 410 may be used for additional robustness. For example, the illustrative Gabor jet 408 includes four Gabor kernels 410*a*, 410*b*, 410*c*, 410*d* with phase angles of zero degrees, 45 degrees, 90 degrees, and 135 degrees, respectively. The Gabor jet 408 outputs a magnitude 412 and a phase (not shown). The magnitude 412 represents IR contour information that highlights the saliency boundaries of the input IR image 406 with a gradient per pixel. Thus, the magnitude 412 may be normalized or otherwise invariant with respect to scene temperature. The magnitude 412 is output as the thermal boundary saliency image 308 of FIG. 3.

Figure 5:
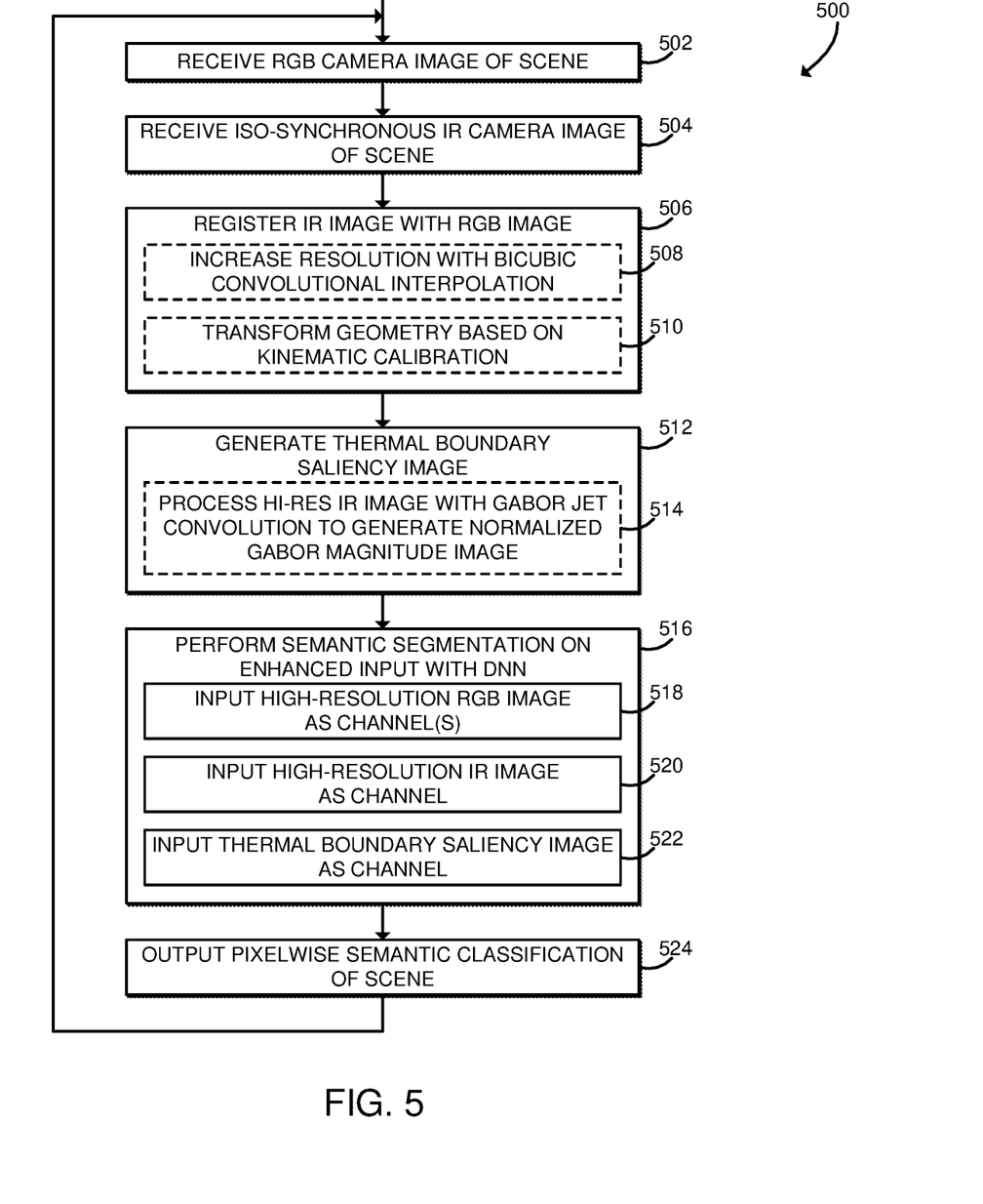
FIG. 5 is a simplified flow diagram of at least one embodiment of a method for thermal enhanced semantic segmentation that may be executed by the computing device of FIGS. 1 and 2.

Referring now to FIG. 5, in use, the computing device 100 may execute a method 500 for thermal enhanced semantic segmentation. It should be appreciated that, in some embodiments, the operations of the method 500 may be performed by one or more components of the environment 200 of the computing device 100 as shown in FIG. 2. The method 500 begins in block 502, in which the computing device 100 receives an RGB camera image 208 of a scene. The RGB camera image 208 may be received, for example, from the RGB camera 130 of the computing device 100. In some embodiments, the RGB camera image 208 may be received from a remote camera device.

In block 504, the computing device 100 receives an IR camera image 210 of the same scene as the RGB camera image 208. The IR camera image 210 may be received, for example, from the IR camera 132 of the computing device 100. The IR camera image 210 is iso-synchronous with the RGB camera image 208 or otherwise captured at the same time as the RGB camera image 208. The IR camera image 210 and the RGB camera image 208 may be made temporally consistent using iso-synchronous hardware triggering or other synchronization techniques. In some embodiments, the IR camera image 210 may be received from a remote camera device.

In block 506, the computing device 100 registers the IR camera image 210 with the RGB camera image 208. The computing device 100 may transform, interpolate, or otherwise adjust the IR camera image 210 to create spatially coherent IR and visible light image data. The computing device 100 may compute a point-to-point location (subpixel)

in the IR image frame associated with each of the pixels of the RGB image. In some embodiments, in block 508 the computing device 100 may increase the resolution of the IR camera image 210 with bicubic convolutional interpolation. After interpolation, the registered IR image may have the same resolution as the RGB camera image 208. In some embodiments, in block 510 the computing device 100 may transform geometry of the IR image based on a kinematic calibration associated with the IR camera 132. For example, the IR image may be transformed using any appropriate camera calibration and re-projection algorithm. Geometric registration and interpolation using such a convolutional approach may improve signal quality by incorporating affine distortion in the interpolation process. The resulting registered IR image provides for both RGB and IR information for each pixel in the combined field of view of the cameras 130, 132.

In block 512, the computing device 100 generates a thermal boundary saliency image based on the registered IR image. The thermal boundary saliency image represents IR contour information from the IR image. The thermal boundary saliency image highlights saliency boundaries of the registered IR image with a gradient per pixel. Thus, the thermal boundary saliency image may represent boundaries between objects with different surface temperatures, even if those objects have similar surface colors. The thermal boundary saliency image may be normalized with respect to temperature and thus may be invariant to scene temperatures. For example, the same approach may be used for a relatively hot scene (e.g., an intersection in summer) and a relatively cold scene (e.g., a road in winter). In some embodiments, in block 514 the computing device 100 may process the high-resolution IR image with a Gabor jet convolution to generate a normalized Gabor magnitude image. As described above, the Gabor jet may be embodied as a bank of Gabor kernels aligned at different phase angles. Each Gabor kernel may be embodied as an oriented filter composed by harmonics (e.g., a sinusoidal wave or plane wave) and a Gaussian kernel. The thermal boundary saliency image may be embodied as the Gabor magnitude image.

In block 516, the computing device 100 performs semantic segmentation on enhanced input using a deep neural network (DNN). As described above, the DNN may be embodied as a multi-layered artificial neural network that supports channel stacking at the input layers. In block 518, the high-resolution RGB image 208 is input to the DNN as one or more channels. For example, each of the red, blue, and green color channels may be input as separate channels to the DNN. In block 520, the high-resolution registered IR image is input to the DNN as a channel. In block 522, the thermal boundary saliency image is input to the DNN as a channel.

In block 524, the computing device 100 outputs a pixelwise semantic classification of the scene from the DNN. As described above, the pixelwise semantic classification may identify each pixel in the scene as belonging to a particular class of object, such as dynamic objects (e.g., vehicles, pedestrians, obstacles in the roadway, foreground objects, etc.) and static objects (e.g., road surface, road markings, buildings, background objects, etc.). The pixelwise semantic classification may be used by the computing device 100 for autonomous vehicle control or other computer vision applications. After outputting the classification, the method 500 loops back to block 502 to continue processing additional image data.

It should be appreciated that, in some embodiments, the method 500 may be embodied as various instructions stored on a computer-readable media, which may be executed by the processor 120, a graphical processing unit (GPU), and/or other components of the computing device 100 to cause the computing device 100 to perform the method 500. The computer-readable media may be embodied as any type of media capable of being read by the computing device 100 including, but not limited to, the memory 124, the data storage device 126, firmware devices, other memory or data storage devices of the computing device 100, portable media readable by a peripheral device 134 of the computing device 100, and/or other media.

Examples

Illustrative examples of the technologies disclosed herein are provided below. An embodiment of the technologies may include any one or more, and any combination of, the examples described below.

Example 1 includes a computing device for semantic classification, the computing device comprising: an input enhancer to (i) register an input infrared light image of a scene to a visible light image of the scene to generate a registered infrared light image, wherein the registered infrared light image has a resolution equal to a resolution of the visible light image, and (ii) generate a thermal boundary saliency image based on the registered infrared light image; and a semantic classifier to (i) perform semantic segmentation on the visible light image, the registered infrared light image, and the thermal boundary saliency image, and (ii) output a pixelwise semantic classification of the scene in response to performance of the semantic segmentation.

Example 2 includes the subject matter of Example 1, and further comprising an input manager to: receive the visible light image from a visible light camera; and receive the input infrared light image from an infrared light camera.

Example 3 includes the subject matter of any of Examples 1 and 2, and wherein the computing device, the visible light camera, and the infrared light camera are included in an advanced vehicle.

Example 4 includes the subject matter of any of Examples 1-3, and wherein to register the input infrared light image comprises to increase a resolution of the input infrared light image to generate the registered infrared light image.

Example 5 includes the subject matter of any of Examples 1-4, and wherein to increase the resolution of the input resolution infrared light image comprises to perform bicubic convolutional interpolation on the input infrared light image.

Example 6 includes the subject matter of any of Examples 1-5, and wherein to register the input infrared light image comprises to transform a geometry of the input infrared light image based on a kinematic calibration associated with the input infrared light image.

Example 7 includes the subject matter of any of Examples 1-6, and wherein to generate the thermal boundary saliency image comprises to process the registered infrared light image with a Gabor jet convolution, wherein the thermal boundary saliency image comprises a Gabor magnitude image.

Example 8 includes the subject matter of any of Examples 1-7, and wherein the Gabor jet convolution comprises a plurality of Gabor kernel convolution layers, wherein each Gabor kernel convolution layer has a different phase angle.

Example 9 includes the subject matter of any of Examples 1-8, and wherein to perform the semantic segmentation comprises to process the visible light image, the registered infrared light image, and the thermal boundary saliency image with an artificial neural network.

Example 10 includes the subject matter of any of Examples 1-9, and wherein to perform the semantic segmentation comprises to: input each color of the visible light image as a channel to the artificial neural network, input the registered infrared light image as a channel to the artificial neural network, and input the thermal boundary saliency image as a channel to the artificial neural network.

Example 11 includes a method for semantic classification, the method comprising: registering, by a computing device, an input infrared light image of a scene to a visible light image of the scene to generate a registered infrared light image, wherein the registered infrared light image has a resolution equal to a resolution of the visible light image; generating, by the computing device, a thermal boundary saliency image based on the registered infrared light image; performing, by the computing device, semantic segmentation on the visible light image, the registered infrared light image, and the thermal boundary saliency image; and outputting, by the computing device, a pixelwise semantic classification of the scene in response to performing the semantic segmentation.

Example 12 includes the subject matter of Example 11, and further comprising: receiving, by the computing device, the visible light image from a visible light camera; and receiving, by the computing device, the input infrared light image from an infrared light camera.

Example 13 includes the subject matter of any of Examples 11 and 12, and wherein the computing device, the visible light camera, and the infrared light camera are included in an advanced vehicle.

Example 14 includes the subject matter of any of Examples 11-13, and wherein registering the input infrared light image comprises increasing a resolution of the input infrared light image to generate the registered infrared light image.

Example 15 includes the subject matter of any of Examples 11-14, and wherein increasing the resolution of the input resolution infrared light image comprises performing bicubic convolutional interpolation on the input infrared light image.

Example 16 includes the subject matter of any of Examples 11-15, and wherein registering the input infrared light image comprises transforming a geometry of the input infrared light image based on a kinematic calibration associated with the input infrared light image.

Example 17 includes the subject matter of any of Examples 11-16, and wherein generating the thermal boundary saliency image comprises processing the registered infrared light image with a Gabor jet convolution, wherein the thermal boundary saliency image comprises a Gabor magnitude image.

Example 18 includes the subject matter of any of Examples 11-17, and wherein the Gabor jet convolution comprises a plurality of Gabor kernel convolution layers, wherein each Gabor kernel convolution layer has a different phase angle.

Example 19 includes the subject matter of any of Examples 11-18, and wherein performing the semantic segmentation comprises processing the visible light image, the registered infrared light image, and the thermal boundary saliency image with an artificial neural network.

Example 20 includes the subject matter of any of Examples 11-19, and wherein performing the semantic segmentation comprises inputting each color of the visible light image as a channel to the artificial neural network, inputting the registered infrared light image as a channel to the artificial neural network, and inputting the thermal boundary saliency image as a channel to the artificial neural network.

Example 21 includes a computing device comprising: a processor; and a memory having stored therein a plurality of instructions that when executed by the processor cause the computing device to perform the method of any of Examples 11-20.

Example 22 includes one or more non-transitory, computer readable storage media comprising a plurality of instructions stored thereon that in response to being executed result in a computing device performing the method of any of Examples 11-20.

Example 23 includes a computing device comprising means for performing the method of any of Examples 11-20.

The invention claimed is:

1. A computing device for semantic classification, the computing device comprising: an input enhancer to (i) register an input infrared light image of a scene to a visible light image of the scene to generate a registered infrared light image, wherein the registered infrared light image has a resolution equal to a resolution of the visible light image, and (ii) generate a thermal boundary saliency image based on the registered infrared light image, wherein the thermal boundary saliency image highlights saliency boundaries of the registered infrared light image; and a semantic classifier to (i) perform semantic segmentation on the visible light image, the registered infrared light image, and the thermal boundary saliency image, and (ii) output a pixelwise semantic classification of the scene in response to performance of the semantic segmentation.

2. The computing device of claim 1, further comprising an input manager to:
receive the visible light image from a visible light camera; and
receive the input infrared light image from an infrared light camera.

3. The computing device of claim 2, wherein the computing device, the visible light camera, and the infrared light camera are included in an advanced vehicle.

4. The computing device of claim 1, wherein to register the input infrared light image comprises to increase a resolution of the input infrared light image to generate the registered infrared light image.

5. The computing device of claim 4, wherein to increase the resolution of the input resolution infrared light image comprises to perform bicubic convolutional interpolation on the input infrared light image.

6. The computing device of claim 1, wherein to register the input infrared light image comprises to transform a geometry of the input infrared light image based on a kinematic calibration associated with the input infrared light image.

7. The computing device of claim 1, wherein to generate the thermal boundary saliency image comprises to process the registered infrared light image with a Gabor jet convolution, wherein the thermal boundary saliency image comprises a Gabor magnitude image.

8. The computing device of claim 7, wherein the Gabor jet convolution comprises a plurality of Gabor kernel convolution layers, wherein each Gabor kernel convolution layer has a different phase angle.

9. The computing device of claim 1, wherein to perform the semantic segmentation comprises to process the visible light image, the registered infrared light image, and the thermal boundary saliency image with an artificial neural network.

10. The computing device of claim 9, wherein to perform the semantic segmentation comprises to: input each color of the visible light image as a channel to the artificial neural network, input the registered infrared light image as a channel to the artificial neural network, and input the thermal boundary saliency image as a channel to the artificial neural network.

11. One or more non-transitory computer-readable storage media comprising a plurality of instructions stored thereon that, in response to being executed, cause a computing device to: register an input infrared light image of a scene to a visible light image of the scene to generate a registered infrared light image, wherein the registered infrared light image has a resolution equal to a resolution of the visible light image; generate a thermal boundary saliency image based on the registered infrared light image, wherein the thermal boundary saliency image highlights saliency boundaries of the registered infrared light image; perform semantic segmentation on the visible light image, the registered infrared light image, and the thermal boundary saliency image; and output a pixelwise semantic classification of the scene in response to performing the semantic segmentation.

12. The one or more computer-readable storage media of claim 11, further comprising a plurality of instructions stored thereon that, in response to being executed, cause the computing device to:
receive the visible light image from a visible light camera; and
receive the input infrared light image from an infrared light camera.

13. The one or more computer-readable storage media of claim 12, wherein the computing device, the visible light camera, and the infrared light camera are included in an advanced vehicle.

14. The one or more computer-readable storage media of claim 11, wherein to register the input infrared light image comprises to increase a resolution of the input infrared light image to generate the registered infrared light image.

15. The one or more computer-readable storage media of claim 11, wherein to register the input infrared light image comprises to transform a geometry of the input infrared light image based on a kinematic calibration associated with the input infrared light image.

16. The one or more computer-readable storage media of claim 11, wherein to generate the thermal boundary saliency image comprises to process the registered infrared light image with a Gabor jet convolution, wherein the thermal boundary saliency image comprises a Gabor magnitude image.

17. The one or more computer-readable storage media of claim 16, wherein the Gabor jet convolution comprises a plurality of Gabor kernel convolution layers, wherein each Gabor kernel convolution layer has a different phase angle.

18. The one or more computer-readable storage media of claim 11, wherein to perform the semantic segmentation comprises to process the visible light image, the registered infrared light image, and the thermal boundary saliency image with an artificial neural network.

19. A method for semantic classification, the method comprising: registering, by a computing device, an input infrared light image of a scene to a visible light image of the scene to generate a registered infrared light image, wherein the registered infrared light image has a resolution equal to a resolution of the visible light image; generating, by the computing device, a thermal boundary saliency image based on the registered infrared light image, wherein the thermal boundary saliency image highlights saliency boundaries of the registered infrared light image; performing, by the computing device, semantic segmentation on the visible light image, the registered infrared light image, and the thermal boundary saliency image; and outputting, by the computing device, a pixelwise semantic classification of the scene in response to performing the semantic segmentation.

20. The method of claim 19, further comprising:
receiving, by the computing device, the visible light image from a visible light camera; and
receiving, by the computing device, the input infrared light image from an infrared light camera.

21. The method of claim 20, wherein the computing device, the visible light camera, and the infrared light camera are included in an advanced vehicle.

22. The method of claim 19, wherein registering the input infrared light image comprises increasing a resolution of the input infrared light image to generate the registered infrared light image.

23. The method of claim 19, wherein registering the input infrared light image comprises transforming a geometry of the input infrared light image based on a kinematic calibration associated with the input infrared light image.

24. The method of claim 19, wherein generating the thermal boundary saliency image comprises processing the registered infrared light image with a Gabor jet convolution, wherein the thermal boundary saliency image comprises a Gabor magnitude image.

25. The method of claim 19, wherein performing the semantic segmentation comprises processing the visible light image, the registered infrared light image, and the thermal boundary saliency image with an artificial neural network.

* * * * *